United States Patent
Hoshino

(10) Patent No.: US 11,491,849 B2
(45) Date of Patent: Nov. 8, 2022

(54) VEHICLE CONTROL DEVICE

(71) Applicant: TOYOTA JIDOSHA KABUSHIKI KAISHA, Aichi-ken (JP)

(72) Inventor: Yu Hoshino, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/336,313

(22) Filed: Jun. 2, 2021

(65) Prior Publication Data
US 2022/0088999 A1   Mar. 24, 2022

(30) Foreign Application Priority Data

Sep. 18, 2020   (JP) .............................. JP2020-156963

(51) Int. Cl.
*B60H 1/32*   (2006.01)
*B60H 1/00*   (2006.01)

(52) U.S. Cl.
CPC ....... *B60H 1/3213* (2013.01); *B60H 1/00392* (2013.01); *B60H 1/3222* (2013.01); *B60H 2001/3272* (2013.01); *B60H 2001/3292* (2013.01)

(58) Field of Classification Search
CPC .............. B60H 1/3213; B60H 1/00392; B60H 1/3222; B60H 2001/3272; B60H 2001/3292; B60H 1/00428; B60H 1/00771; B60H 1/3208
See application file for complete search history.

(56) References Cited

U.S. PATENT DOCUMENTS

| | | | |
|---|---|---|---|
| 2013/0151049 A1* | 6/2013 | Higashitani | B60L 1/003 701/22 |
| 2013/0228324 A1* | 9/2013 | Kim | F25B 29/003 165/253 |
| 2019/0092134 A1* | 3/2019 | Vehr | B60H 1/00428 |

FOREIGN PATENT DOCUMENTS

| JP | 08205302 A | * | 8/1996 |
|---|---|---|---|
| JP | H8205302 A | | 8/1996 |

* cited by examiner

*Primary Examiner* — Marc E Norman
*Assistant Examiner* — Matthew John Moscola
(74) *Attorney, Agent, or Firm* — Hauptman Ham, LLP

(57) ABSTRACT

During pre-air conditioning in a vehicle cabin, when consumed electric power exceeds use permission electric power while an auxiliary heating device is operating, an operation of the auxiliary heating device is stopped. In contrast, when the consumed electric power exceeds the use permission electric power while the auxiliary heating device is not operating, a rotation speed of an electric compressor of an air conditioner is restricted. Therefore, the temperature environment in the vehicle cabin is improved by continuing the pre-air conditioning of the air conditioner while reducing the consumed electric power by stopping the operation of the auxiliary heating device.

3 Claims, 4 Drawing Sheets

VEHICLE CONTROL DEVICE

CROSS-REFERENCE TO RELATED APPLICATION

This application claims priority to Japanese Patent Application No. 2020-156963 filed on Sep. 18, 2020, incorporated herein by reference in its entirety.

BACKGROUND

1. Technical Field

The present disclosure relates to a vehicle control device. In particular, the present disclosure relates to a control device for a vehicle equipped with an air conditioner capable of performing pre-air conditioning that pre-air-conditions the inside of the vehicle cabin before a user gets on the vehicle.

2. Description of Related Art

Conventionally, for example, an electric vehicle is equipped with an air conditioner provided with an electric compressor, and air-conditioning of the inside of the vehicle cabin is performed by operating the electric compressor using the electric power stored in the battery. Since the traveling force source (traveling motor) of the electric vehicle also uses the electric power stored in the battery, the air conditioner is controlled so as to secure the amount of the electric power stored in the battery which is required until the electric vehicle reaches the destination (see Japanese Unexamined Patent Application Publication No. 8-205302 (JP 8-205302 A)). JP 8-205302 A discloses that, when the consumed electric power associated with the operation of the air conditioner exceeds the permissible electric power consumption value (use permission electric power) that is determined by the remaining capacity of the battery, the rotation speed of the electric compressor is reduced to reduce the consumed electric power.

SUMMARY

There is known a vehicle equipped with an air conditioner capable of performing pre-air conditioning for improving the vehicle cabin environment (temperature environment in the vehicle cabin, etc.) before the user gets on the vehicle. This pre-air conditioning is performed when the user operates a mobile communication terminal such as an electronic key or a smartphone and transmits a pre-air conditioning start instruction signal to the air conditioner of the vehicle before getting on the vehicle. The air conditioner that has received the pre-air conditioning start instruction signal performs pre-air conditioning by setting the blowing temperature of the air-conditioning air and setting the blowing mode according to the vehicle cabin temperature, the vehicle cabin set temperature, and the like. As a result, the temperature environment in the vehicle cabin when the user gets on the vehicle is improved, and the comfort in the vehicle cabin can be ensured.

In addition, an auxiliary device (a device that directly applies heat to the user) such as a seat heater and a radiant heater is known as a device for improving occupant comfort, and this auxiliary device can be operated when pre-air conditioning is performed (for example, when pre-air conditioning is performed in winter) to further improve comfort. The operation of this auxiliary device is also instructed when the user operates the mobile communication terminal.

When pre-air conditioning with the air conditioner and operation of the auxiliary device are performed at the same time, the consumed electric power becomes large. In such a situation, as in JP 8-205302 A, in the case where the consumed electric power exceeds the permissible electric power consumption value (due to combined use of the air conditioner and the auxiliary device), when the rotation speed of the electric compressor is reduced, the temperature in the vehicle cabin when the user gets on the vehicle is not sufficiently improved (for example, the temperature in the vehicle cabin is not sufficiently high in winter), which makes it unlikely to obtain sufficient comfort in the vehicle cabin.

In view of this point, the inventor of the present disclosure focused on the fact that, during pre-air conditioning when the user has not gotten on the vehicle yet, giving priority to improving the temperature environment in the vehicle cabin by operating the air conditioner rather than operating the auxiliary device that directly applies heat to the occupant is beneficial in ensuring the comfort in the vehicle cabin when the user gets on the vehicle, which led to the present disclosure.

The present disclosure has been made in view of the above point, and an object of the present disclosure is to provide a vehicle control device capable of improving the temperature environment in the vehicle cabin during pre-air conditioning.

The solution of the present disclosure for achieving the above object presupposes a vehicle control device that controls each of a heat pump air conditioner and an auxiliary device. The air conditioner is equipped with an electric compressor that is operated by electric power from a battery and is able to perform pre-air conditioning that pre-air-conditions an inside of a vehicle cabin before a user gets on a vehicle. The auxiliary device is operated by the electric power from the battery and is configured to directly apply heat to or remove heat from an occupant in the vehicle cabin. The vehicle control device includes: a power consumption determination unit that determines whether consumed electric power exceeds a preset use permission electric power during the pre-air conditioning; an auxiliary device control unit that stops operation of the auxiliary device when the power consumption determination unit determines that the consumed electric power exceeds the use permission electric power while the auxiliary device is operating; and a compressor control unit that restricts a rotation speed of the electric compressor when the power consumption determination unit determines that the consumed electric power exceeds the use permission electric power while the auxiliary device is not operating.

Due to this specific matter, when the consumed electric power exceeds the use permission electric power while the auxiliary device is operating during pre-air conditioning that is performed before the user gets on the vehicle, the operation of the auxiliary device is stopped. In contrast, when the consumed electric power exceeds the use permission electric power while the auxiliary device is not operating, the rotation speed of the electric compressor of the air conditioner is restricted. In this way, when the consumed electric power exceeds the use permission electric power, the auxiliary device is preferentially stopped over the air conditioner, and the pre-air conditioning by the air conditioner is continued. Therefore, while reducing the consumed electric power by stopping the operation of the auxiliary device, it is possible to improve the temperature environment in the vehicle cabin by pre-air conditioning. As a result, it is possible to satisfactorily ensure the comfort in the vehicle cabin when the user gets on the vehicle.

Further, a condition for permitting the operation of the auxiliary device after the operation of the auxiliary device is stopped by the auxiliary device control unit includes that the power consumption determination unit determines that the consumed electric power falls below the use permission electric power.

When the consumed electric power falls below the use permission electric power after the operation of the auxiliary device is stopped, even when the auxiliary device is operated, it can be determined to be unlikely that or it can be determined that there is little possibility that the amount of the electric power stored in the battery will be insufficient (for example, it is unlikely that the amount of the stored electric power will become insufficient during pre-air conditioning to the extent that it adversely affects the traveling of the vehicle). Thus, the operation (restart) of the auxiliary device is permitted. As a result, it is possible to satisfactorily ensure the comfort (comfort due to the operation of the auxiliary device) when the user gets on the vehicle.

Further, a condition for permitting the operation of the auxiliary device after the operation of the auxiliary device is stopped by the auxiliary device control unit includes that a remaining time of the pre-air conditioning is less than a preset time.

When the remaining time of pre-air conditioning is less than the preset time, even when the operation of the auxiliary device is started at that time, it can be determined to be unlikely that or it can be determined that there is little possibility that the amount of the electric power stored in the battery will be insufficient. Thus, the operation (restart) of the auxiliary device is permitted. As a result, it is possible to satisfactorily ensure the comfort (comfort due to the operation of the auxiliary device) when the user gets on the vehicle.

In the present disclosure, when the consumed electric power exceeds the use permission electric power while the auxiliary device is operating during pre-air conditioning in the vehicle cabin that is performed before the user gets on the vehicle, the operation of the auxiliary device is stopped. In contrast, when the consumed electric power exceeds the use permission electric power while the auxiliary device is not operating, the rotation speed of the electric compressor of the air conditioner is restricted. In this way, by giving priority to stopping the operation of the auxiliary device, it is possible to improve the temperature environment in the vehicle cabin by pre-air conditioning while reducing the consumed electric power. As a result, it is possible to satisfactorily ensure the comfort in the vehicle cabin when the user gets on the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings. In the present embodiment, the case where the present disclosure is applied to an electric vehicle equipped with an air conditioner capable of performing pre-air conditioning for improving the vehicle cabin environment before a user gets on a vehicle will be described.

Outline Structure of Electric Vehicle

Figure 1:
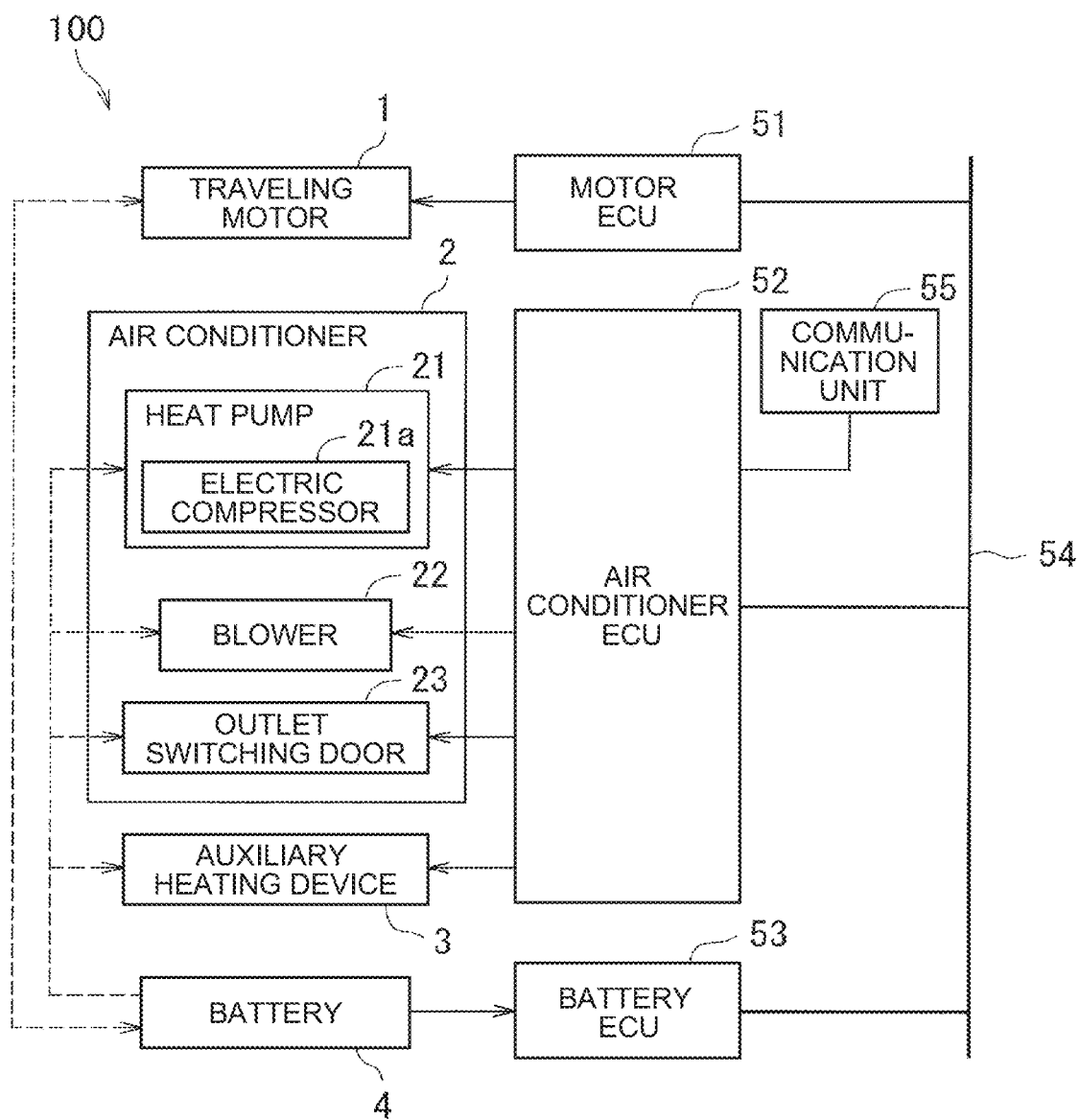
FIG. 1 is a block diagram showing a schematic configuration of an electric vehicle according to an embodiment.

FIG. 1 is a block diagram showing a schematic configuration of an electric vehicle 100 according to the present embodiment. As shown in FIG. 1, the electric vehicle 100 includes a traveling motor 1, an air conditioner 2, an auxiliary heating device 3 as an auxiliary device according to the present disclosure, and a battery 4. In FIG. 1, the solid arrows indicate control signals, and the broken arrows indicate the exchange of electric power.

The traveling motor 1 is driven by electric power from the battery 4 and is provided to generate a driving force for traveling of the electric vehicle 100. The traveling motor 1 is configured to function as a generator depending on the traveling state of the electric vehicle 100. The electric power generated by the traveling motor 1 is stored in the battery 4.

The air conditioner 2 is configured to blow out air-conditioning air whose temperature and humidity are adjusted from the air outlet to the vehicle cabin. For example, the cooling mode and the heating mode can be set as the operation mode of the air conditioner 2, and the face mode, the bi-level mode, the foot mode, and the defroster mode can be set as the outlet mode of the air conditioner 2. The air conditioner 2 includes a heat pump 21, a blower 22, and outlet switching doors 23.

The heat pump 21 includes, for example, an electric compressor 21a, an outdoor heat exchanger (not shown), an indoor heat exchanger, a heating expansion valve, and the like, and a refrigerant circulation path is established in accordance with the operation mode. The electric compressor 21a is provided to circulate the refrigerant in the circulation path. The electric compressor 21a is operated by electric power from the battery 4, and is configured so that the rotation speed can be adjusted by, for example, inverter control. The outdoor heat exchanger is arranged in the motor compartment (the space in the front part of the vehicle body in which the traveling motor 1 is housed), and the indoor heat exchanger is arranged in the blower duct. The heating expansion valve reduces the pressure of the refrigerant circulated in the circulation path (for example, reduces the pressure of the refrigerant flowing out of the indoor heat exchanger during the heating operation).

The blower 22 is configured to selectively take in outside air and inside air to generate blown air and send it out to the blower duct. The blower 22 is operated by electric power from the battery 4 and is configured so that the rotation speed can be adjusted.

In the cooling mode, the outdoor heat exchanger functions as a condenser and the indoor heat exchanger functions as an evaporator, so that the blown air is cooled in the indoor heat exchanger. In the heating mode, the indoor heat exchanger functions as a condenser and the outdoor heat exchanger functions as an evaporator, so that the blown air is warmed in the indoor heat exchanger. A heating heat exchanger may be arranged in the blower duct separately from the indoor heat exchanger, and the blown air dehumidified in the indoor heat exchanger may be heated by the heating heat exchanger.

A plurality of outlets is provided at the downstream end of the blower duct, and the outlet switching doors 23 are provided at the outlets. The outlets include a face outlet that blows air-conditioning air toward the upper body of the occupant in the vehicle cabin, a foot outlet that blows air-conditioning air toward the feet of the occupant in the vehicle cabin, and a defroster outlet that blows air-conditioning air toward the inner surface of the windshield.

In the face mode, the outlet switching door 23 opens the face outlet, so that the air-conditioning air is blown out from the face outlet. In the bi-level mode, the outlet switching door 23 opens the face outlet and the foot outlet, so that the air-conditioning air is blown out from the face outlet and the foot outlet. In the foot mode, the outlet switching door 23 opens the foot outlet, so that the air-conditioning air is blown out from the foot outlet. In the defroster mode, the outlet switching door 23 opens the defroster outlet, so that the air-conditioning air is blown out from the defroster outlet.

Figure 3:
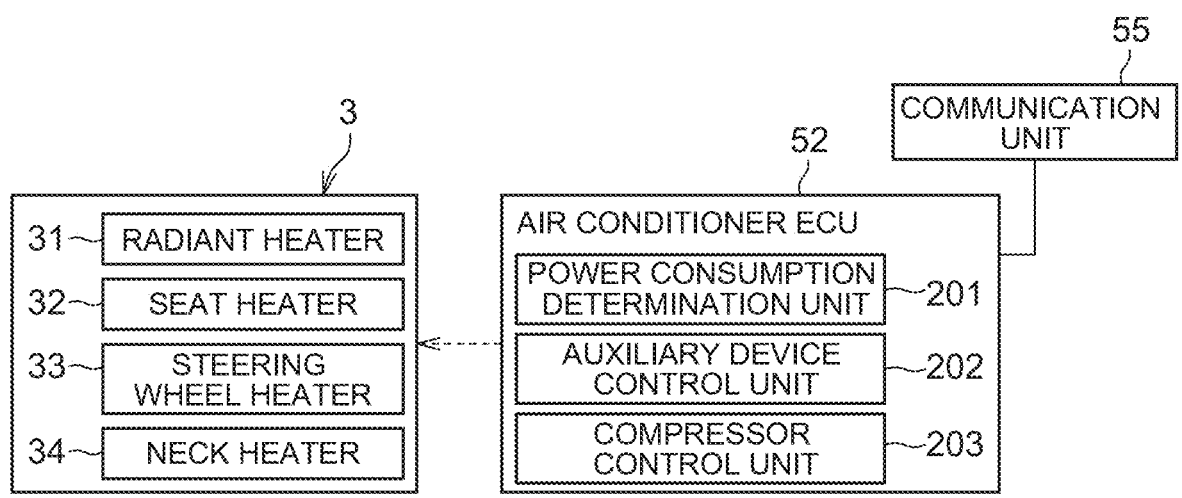
FIG. 3 is a block diagram illustrating a configuration of an air conditioner electronic control unit (ECU) and an auxiliary heating device.

The auxiliary heating device 3 is an electric heater operated by electric power from the battery 4, and is configured to directly apply heat to the occupant in the vehicle cabin. Examples of the auxiliary heating device 3 include a radiant heater 31, a seat heater 32, a steering wheel heater 33, and a neck heater 34, as shown in FIG. 3 (block diagram illustrating the configuration of an air conditioner electronic control unit (ECU) 52 and the auxiliary heating device 3).

The radiant heater 31 is arranged in the vehicle cabin so that the occupant is irradiated with electromagnetic waves from the heat source. The seat heater 32 is arranged on the seat on which the occupant sits, and is provided so as to warm the back side of the occupant. The steering wheel heater 33 is arranged on the steering wheel and is provided to warm the driver's hands. The neck heater 34 is arranged, for example, in the headrest of the seat on which the occupant sits, and is provided so as to blow warm air around the neck of the occupant. The auxiliary heating device 3 is not limited to these, and various devices can be applied. Further, it is not necessary to include all of these auxiliary heating devices 31 to 34.

The battery 4 is chargeable and dischargeable, and is configured to supply electric power for driving the traveling motor 1 and to store the electric power generated by the traveling motor 1. Further, the battery 4 is configured to supply electric power for operating the air conditioner 2 and the auxiliary heating device 3. Specifically, the electric power from the battery 4 is supplied to the electric compressor 21a of the heat pump 21, the blower 22, and the outlet switching doors 23 of the air conditioner 2 to operate them. Further, the electric power from the battery 4 is supplied to the auxiliary heating devices 31 to 34 to operate them.

Further, the electric vehicle 100 includes a motor ECU 51, the air conditioner ECU 52, and a battery ECU 53, which are connected by a bus 54. The motor ECU 51, the air conditioner ECU 52, and the battery ECU 53 are configured to be able to communicate with each other via the bus 54.

The motor ECU 51 is provided to control the traveling motor 1. The battery ECU 53 is provided to manage the battery 4. For example, the battery ECU 53 is configured to calculate the state of charge (SOC) of the battery 4 and transmit the result to the air conditioner ECU 52.

The air conditioner ECU 52 is provided to control the air conditioner 2 and the auxiliary heating device 3. Further, the air conditioner ECU 52 (more specifically, the read only memory (ROM) of the air conditioner ECU 52) stores a control program for controlling the pre-air conditioning and the auxiliary heating devices 31 to 34, which will be described later. The function of the air conditioner ECU 52 will be described later.

The air conditioner ECU 52 is connected to a communication unit 55. The communication unit 55 is capable of communicating with the outside of the electric vehicle 100. Specifically, wireless communication is performed with the electronic key K carried by the user U (see FIG. 2) (signals received by the air conditioner ECU 52 through this wireless communication will be described later).

Pre-Air Conditioning

The air conditioner 2 in the present embodiment enables pre-air conditioning to improve the vehicle cabin environment before the user gets on the electric vehicle 100.

Figure 2:
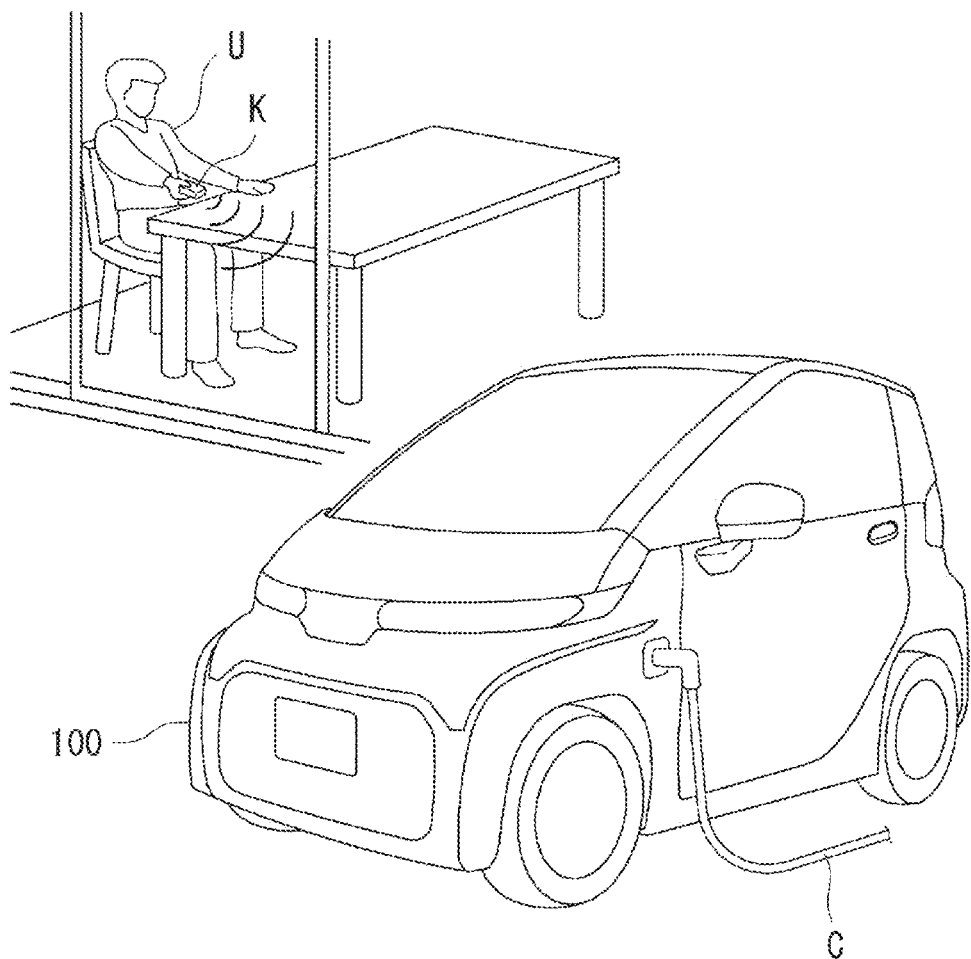
FIG. 2 is a diagram illustrating a situation in which pre-air conditioning is performed.

FIG. 2 is a diagram illustrating a situation in which the pre-air conditioning is performed, and shows a state in which the charging cable C is connected to the electric vehicle 100 and the battery 4 is being charged by an external power source. As shown in FIG. 2, the user U can operate the portable electronic key K even when the electric vehicle 100 is parked (the user U is not on the vehicle) to control the electric vehicle 100. Instead of the electronic key K, a mobile communication terminal such as a smartphone may be used. The electronic key K is configured to enable wireless communication with the electric vehicle 100. The operation of the electronic key K includes an air conditioning operation (an operation for performing pre-air conditioning) of the electric vehicle 100. Further, the operation of the electronic key K may include user collation, vehicle door lock control, and the like.

The user U can perform air conditioning (pre-air conditioning) in the vehicle cabin with the air conditioner 2 by operating the electronic key K before getting on the electric vehicle 100. Signals transmitted to the air conditioner ECU 52 of the electric vehicle 100 by operating the electronic key K include a pre-air conditioning start command signal and a vehicle cabin set temperature signal. It is also possible to instruct the operation of the auxiliary heating device 3 by operating the electronic key K. Thus, when the user U operates the electronic key K to instruct the start of the pre-air conditioning and the operation of the auxiliary heating device 3, the pre-air conditioning is performed using the air conditioner 2 and the auxiliary heating device 3 in combination. The instruction of the operation of the auxiliary heating device 3 may be individually given to each of the radiant heater 31, the seat heater 32, the steering wheel heater 33, and the neck heater 34, or may be collectively given to all the auxiliary heating devices 31 to 34.

FIG. 3 is a block diagram illustrating the configuration of the air conditioner ECU 52 and the auxiliary heating devices 31 to 34. As described above, the air conditioner ECU 52 can transmit the operation start signal, the operation stop signal, and the like to the radiant heater 31, the seat heater 32, the steering wheel heater 33, and the neck heater 34, which are the auxiliary heating devices 3. Further, the air conditioner ECU 52 receives via the communication unit 55 various signals transmitted when the user U operates the electronic key K. That is, the instruction signal for starting pre-air conditioning, the instruction signal for operating the auxiliary heating device 3, and the like transmitted from the electronic key K are received by the communication unit 55 and input to the air conditioner ECU 52.

As a feature of the present embodiment, the air conditioner ECU 52 includes a power consumption determination unit 201, an auxiliary device control unit 202, and a compressor control unit 203 as its functional units. The power consumption determination unit 201, the auxiliary device control unit 202, and the compressor control unit 203 are realized by a control program stored in the ROM of the air conditioner ECU 52.

The power consumption determination unit 201 is a functional unit that determines whether the consumed electric power exceeds the preset use permission electric power during pre-air conditioning. As a method for calculating the consumed electric power, the same method as that in the related art can be applied. For example, the operating state of the air conditioner 2 (rotation speed of the electric compressor 21a, etc.) and the operating state of the auxiliary heating device 3 (the operating auxiliary heating device among the plurality of auxiliary heating devices 31 to 34) may be monitored to calculate the consumed electric power (sum up the consumed electric power of each operating device), or the amount of change in the SOC of the battery 4 per unit time may be monitored to calculate the consumed electric power. Further, the use permission electric power is set in advance based on an experiment, a simulation, or the like to a level where the amount of the stored electric power does not run out to the extent that it adversely affects the traveling of the vehicle, etc.

The auxiliary device control unit 202 is a functional part that stops the operation of the auxiliary heating device 3 when the power consumption determination unit 201 determines that the consumed electric power exceeds the use permission electric power while the auxiliary heating device 3 is operating. The auxiliary heating device 3 to be stopped here may be all of the auxiliary heating devices 31 to 34, or a part of the auxiliary heating devices 31 to 34 that is preset (for example, at least one auxiliary heating device with a large amount of consumed electric power).

The compressor control unit 203 is a functional part that restricts the rotation speed of the electric compressor 21a when the power consumption determination unit 201 determines that the consumed electric power exceeds the use permission electric power while the auxiliary heating device 3 is not operating. Cases where the auxiliary heating device 3 is not operating here include not only the case where the operation of the auxiliary heating device 3 is stopped by the auxiliary device control unit 202 (it is determined that the consumed electric power exceeds the use permission electric power while the auxiliary heating device 3 is operating and the operation of the auxiliary heating device 3 is stopped), but also the case where only the instruction signal for starting pre-air conditioning is transmitted from the electronic key K (the instruction signal for operating the auxiliary heating device 3 is not transmitted), so that pre-air conditioning is performed without the operation of the auxiliary heating device 3.

Pre-Air Conditioning Control

Figure 4:
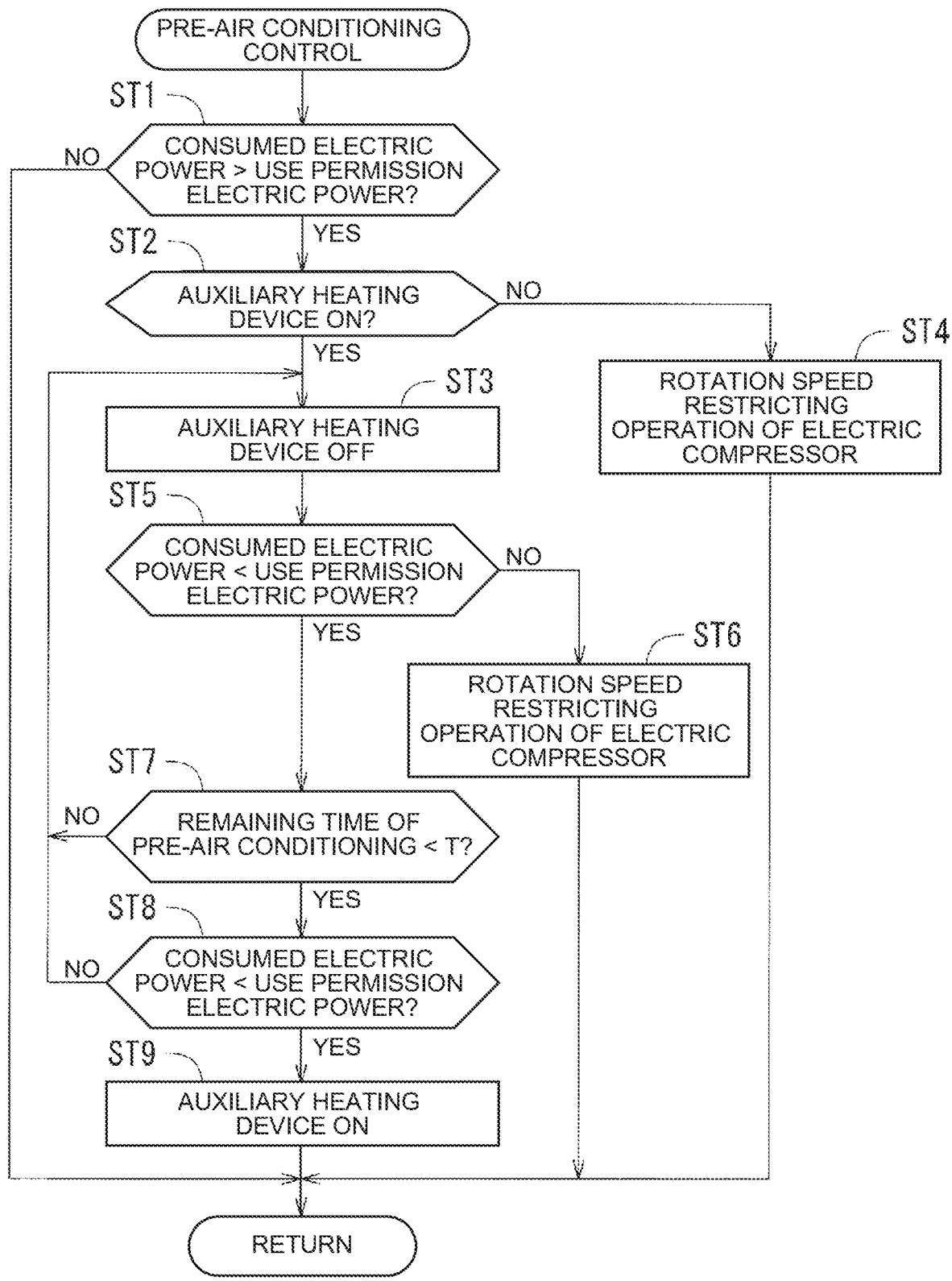
FIG. 4 is a flowchart illustrating a procedure of pre-air conditioning control.

Next, the control of the auxiliary heating device 3 and the electric compressor 21a at the time of performing pre-air conditioning will be described. FIG. 4 is a flowchart illustrating a procedure of pre-air conditioning control. This flowchart is executed every time the user U gives an instruction to perform pre-air conditioning by operating the electronic key K in a state where the user U is not on the electric vehicle 100.

The pre-air conditioning in the present embodiment can be performed in either a state in which the charging cable C is connected to the electric vehicle 100 and the battery 4 is being charged or a state in which the charging cable C is not connected to the electric vehicle 100, on condition that the SOC of the battery 4 is equal to or higher than a predetermined value.

First, in step ST1, it is determined whether the consumed electric power during pre-air conditioning exceeds the preset use permission electric power. This determination is made by the power consumption determination unit 201.

When the consumed electric power during pre-air conditioning does not exceed the use permission electric power and a NO determination is made in step ST1, the current pre-air conditioning can be continued and the process returns.

On the other hand, when the consumed electric power during pre-air conditioning exceeds the use permission electric power and a YES determination is made in step ST1, the process proceeds to step ST2 and it is determined whether the auxiliary heating device 3 is operating (turned on).

When the auxiliary heating device 3 is operating and a YES determination is made in step ST2, the process proceeds to step ST3, and the operation of the currently operating auxiliary heating device 3 is stopped (turned off). For example, the operation of all the auxiliary heating devices 31 to 34 currently in operation is stopped. The operation of the auxiliary heating device 3 is stopped by the auxiliary device control unit 202.

Figure 5:
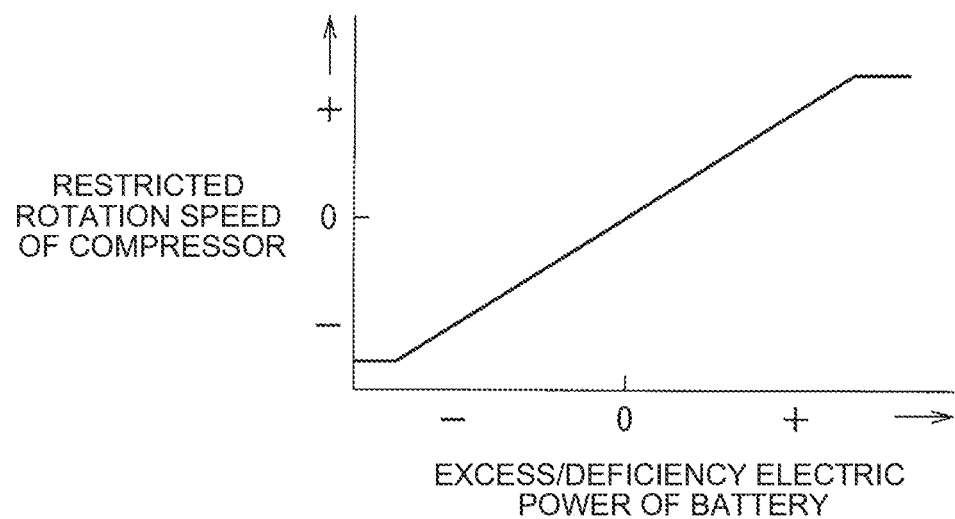
FIG. 5 is a diagram showing a compressor rotation speed restricting map.

When the auxiliary heating device 3 is not operating and a NO determination is made in step ST2, the process proceeds to step ST4 and the rotation speed restricting operation of the electric compressor 21a is executed. The rotation speed restricting operation of the electric compressor 21a is performed by the compressor control unit 203, and is executed according to the compressor rotation speed restricting map shown in FIG. 5 stored in the ROM of the air conditioner ECU 52.

Specifically, in the compressor rotation speed restricting map (FIG. 5), the horizontal axis represents the excess/deficiency electric power of the battery 4, and the vertical axis represents the restricted rotation speed of the electric compressor 21a. The compressor rotation speed restricting map is a map that defines the restricted value of the restricted rotation speed of the electric compressor 21a in accordance with the excess/deficiency electric power of the battery 4. That is, as the excess/deficiency electric power of the battery 4 increases toward the positive side (as the amount of the electric power stored in the battery 4 increases), the restricted rotation speed of the electric compressor 21a also increases toward the positive side (the allowable value of the rotation speed of the electric compressor 21a increases). In contrast, as the excess/deficiency electric power of the battery 4 increases toward the negative side (as the amount of the electric power stored in the battery 4 decreases), the restricted rotation speed of the electric compressor 21a also increases toward the negative side (the allowable value of the rotation speed of the electric compressor 21a decreases). That is, as the amount of the electric power stored in the battery 4 decreases, the restriction on the rotation speed of the electric compressor 21a is increased, thereby reducing the consumed electric power caused by the operation of the electric compressor 21a.

When the operation of the auxiliary heating device 3 is stopped in step ST3, it is determined in step ST5 whether the consumed electric power falls below the use permission electric power. That is, it is determined whether the consumed electric power falls below the use permission electric power due to the stop of the operation of the auxiliary heating device 3.

When the consumed electric power does not fall below the use permission electric power and a NO determination is made in step ST5, the process proceeds to step ST6, and the rotation speed restricting operation of the electric compressor 21a is executed as in the case of step ST4 described above. That is, the rotation speed restricting operation is executed according to the compressor rotation speed restricting map described above. The compressor rotation speed restricting map used here may be the same map as that used in step ST4 described above (the one shown in FIG. 5), or may be a different compressor rotation speed restricting map.

On the other hand, when the consumed electric power falls below the use permission electric power due to the stop of the operation of the auxiliary heating device 3 and a YES determination is made in step ST5, the process proceeds to step ST7, and it is determined whether the remaining time of pre-air conditioning is less than the predetermined time T. The remaining time of pre-air conditioning is obtained by subtracting the elapsed time of pre-air conditioning from the implementation time of pre-air conditioning (the entire period during which pre-air conditioning is performed). The implementation time of pre-air conditioning may be set to a fixed time, or may be set based on the difference between the vehicle cabin temperature (vehicle cabin temperature detected by the vehicle cabin temperature sensor (not shown)) and the vehicle cabin set temperature. When setting the implementation time of pre-air conditioning based on the difference between the vehicle cabin temperature and the vehicle cabin set temperature, the larger the temperature difference is (when heating is requested, the larger the value obtained by subtracting the vehicle cabin temperature from the vehicle cabin set temperature is, and when cooling is requested, the larger the value obtained by subtracting the vehicle cabin set temperature from the vehicle cabin temperature is), the longer the implementation time of pre-air conditioning is set. Further, the predetermined time T is appropriately set by an experiment or a simulation.

When the remaining time of pre-air conditioning is equal to or more than the predetermined time T and a NO determination is made in step ST7, the process returns to step ST3, and the operations of step ST3 and thereafter described above are repeated.

On the other hand, when the remaining time of pre-air conditioning is less than the predetermined time T and a YES determination is made in step ST7, the process proceeds to step ST8, and it is determined whether the consumed electric power falls below the use permission electric power.

When the consumed electric power does not fall below the use permission electric power and a NO determination is made in step ST8, the process returns to step ST3, and the operations of step ST3 and thereafter described above are repeated.

On the other hand, when the consumed electric power falls below the use permission electric power and a YES determination is made in step ST8, the process proceeds to step ST9 and the operation of the auxiliary heating device 3 is restarted. That is, the operation of the auxiliary heating device 3 is restarted on condition that the remaining time of pre-air conditioning is less than the predetermined time T and the consumed electric power falls below the use permission electric power.

In pre-air conditioning, the above operation is repeated.

Effect of Embodiment

As described above, in the present embodiment, when the consumed electric power exceeds the use permission electric power while the auxiliary heating device 3 is operating during pre-air conditioning in the vehicle cabin that is performed before the user U gets on the vehicle, the operation of the auxiliary heating device 3 is stopped. In contrast, when the consumed electric power exceeds the use permission electric power while the auxiliary heating device 3 is not operating, the rotation speed of the electric compressor 21a of the air conditioner 2 is restricted. In this way, by giving priority to stopping the operation of the auxiliary heating device 3, it is possible to improve the temperature environment in the vehicle cabin by pre-air conditioning while reducing the consumed electric power. As a result, it is possible to satisfactorily ensure the comfort in the vehicle cabin when the user U gets on the electric vehicle 100.

Further, in the present embodiment, conditions for permitting the operation of the auxiliary heating device 3 after the operation of the auxiliary heating device 3 is stopped by the auxiliary device control unit 202 include that the power consumption determination unit 201 determines that the consumed electric power falls below the use permission electric power and that the remaining time of pre-air conditioning is less than the preset time T. When the consumed electric power falls below the use permission electric power after the operation of the auxiliary heating device 3 is stopped, even when the auxiliary heating device 3 is operated, it can be determined to be unlikely that or it can be determined that there is little possibility that the amount of the electric power stored in the battery 4 will be insufficient (for example, it is unlikely that the amount of the stored electric power will become insufficient during pre-air conditioning to the extent that it adversely affects the traveling of the electric vehicle 100). Further, when the remaining time of pre-air conditioning is less than the preset time T, even when the operation of the auxiliary heating device 3 is started at that time, it can be determined to be unlikely that or it can be determined that there is little possibility that the amount of the electric power stored in the battery 4 will be insufficient. Therefore, by permitting the operation (restart) of the auxiliary heating device 3 on these conditions, comfort (comfort due to the operation of the auxiliary heating device 3) can be satisfactorily ensured when the user U gets on the electric vehicle 100 without causing a situation in which the amount of the electric power stored in the battery 4 is insufficient.

Other Embodiment

It should be noted that the present disclosure is not limited to the embodiment above, and all modifications and applications included in the scope of claims and a range equivalent to the scope of claims are possible.

For example, in the above-described embodiment, the case where the present disclosure is applied to the electric vehicle 100 equipped with the air conditioner 2 capable of performing pre-air conditioning has been described. The present disclosure is not limited to this, and can be applied to a plug-in hybrid vehicle equipped with the air conditioner 2 capable of performing pre-air conditioning.

Further, in the above-described embodiment, the case where the present disclosure is applied to the electric vehicle 100 provided with the auxiliary heating device 3 that directly applies heat to the occupant in the vehicle cabin as the auxiliary device has been described. In addition to or instead of this, the present disclosure can also be applied to an electric vehicle provided with an auxiliary cooling device that directly removes heat from the occupant in the vehicle cabin. Examples of this auxiliary cooling device include a seat ventilation system (SVS). This SVS is equipped with a blower fan built into the seat of the driver's seat, passenger seat, etc., and lowers the temperature of the seat by releasing the heat accumulated in the seat by the operation of the blower fan in summer or the like.

Further, in the above embodiment, when the operation of the auxiliary heating device 3 is stopped because the consumed electric power during pre-air conditioning exceeds the use permission electric power, the operation of the auxiliary heating device 3 is permitted on condition that the remaining time of pre-air conditioning is less than the predetermined time T and the consumed electric power falls below the use permission electric power. That is, the operation of the auxiliary heating device 3 is permitted with these two conditions as AND conditions. The present disclosure is not limited to this, and the operation of the auxiliary heating device 3 may be permitted with these two conditions as OR conditions. That is, the operation of the auxiliary heating device 3 may be permitted at the time when the remaining time of pre-air conditioning is less than the predetermined time T, or the operation of the auxiliary heating device 3 may be permitted at the time when the consumed electric power falls below the use permission electric power.

The present disclosure is applicable to a control device for a vehicle equipped with an air conditioner capable of pre-air conditioning and an auxiliary device configured to directly apply heat to or remove heat from an occupant.

What is claimed is:

1. A vehicle control device that controls each of a heat pump air conditioner and an auxiliary device, the air conditioner being equipped with an electric compressor that is operated by electric power from a battery and being able to perform pre-air conditioning that pre-air-conditions an inside of a vehicle cabin before a user gets in a vehicle, and the auxiliary device being operated by the electric power from the battery and being configured to directly apply heat to or remove heat from an occupant in the vehicle cabin, the vehicle control device comprising:

a power consumption determination unit that determines whether consumed electric power exceeds a preset use permission electric power during the pre-air conditioning;

an auxiliary device control unit that stops operation of the auxiliary device when the power consumption determination unit determines that the consumed electric power exceeds the use permission electric power while the auxiliary device is operating; and a compressor control unit that restricts a rotation speed of the electric compressor when the power consumption determination unit determines that the consumed electric power exceeds the use permission electric power while the auxiliary device is not operating.

2. The vehicle control device according to claim 1, wherein a condition for permitting the operation of the auxiliary device after the operation of the auxiliary device is stopped by the auxiliary device control unit includes that the power consumption determination unit determines that the consumed electric power falls below the use permission electric power.

3. The vehicle control device according to claim 1, wherein a condition for permitting the operation of the auxiliary device after the operation of the auxiliary device is stopped by the auxiliary device control unit includes that a remaining time of the pre-air conditioning is less than a preset time.

* * * * *